United States Patent
Tamchina et al.

(10) Patent No.: US 8,170,588 B2
(45) Date of Patent: May 1, 2012

(54) CONTACT INFORMATION UPDATING VIA SMS

(75) Inventors: Phillip George Tamchina, Mountain View, CA (US); Michael M. Lee, San Jose, CA (US); Chad G. Seguin, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 549 days.

(21) Appl. No.: 12/270,798

(22) Filed: Nov. 13, 2008

(65) Prior Publication Data

US 2010/0120453 A1    May 13, 2010

(51) Int. Cl.
*H04W 4/00* (2009.01)
*H04M 1/64* (2006.01)
*G06F 15/16* (2006.01)

(52) U.S. Cl. ........................ 455/466; 379/88.12; 709/206

(58) Field of Classification Search .............. 379/88.12; 709/206

See application file for complete search history.

(56) References Cited

U.S. PATENT DOCUMENTS

| 7,096,255 B2 * | 8/2006 | Malik ............................ 709/206 |
| 2007/0207789 A1 * | 9/2007 | Zellner et al. .................. 455/415 |
| 2008/0089487 A1 * | 4/2008 | Chen et al. .................. 379/88.12 |

* cited by examiner

*Primary Examiner* — Dwayne Bost
*Assistant Examiner* — Joshua Schwartz
(74) *Attorney, Agent, or Firm* — Blakely, Sokoloff, Taylor & Zafman LLP

(57) ABSTRACT

A source mobile telephone detects that a telephone number of the telephone has changed to a new number, and in response, sends a text or short message service (SMS) notice message to contacts identified in the mobile telephone to indicate that the source mobile telephone has a new telephone number. In response to receiving the text or SMS notice message, a contact telephony device may update its contact list to reflect the new number. Other embodiments are also described.

19 Claims, 3 Drawing Sheets

US 8,170,588 B2

CONTACT INFORMATION UPDATING VIA SMS

FIELD

Embodiments of the invention relate to a mobile phone sending text or short message service (SMS) messages to contacts listed in the mobile telephone to indicate that the mobile telephone has a new telephone number. Other embodiments are also described.

BACKGROUND

While continuing to grow in popularity, portable or mobile electronic devices, such as cellular phones or mobile phones have also been growing in complexity. In addition to supporting wireless voice communication, mobile devices or phones, such as the iPhone™ multifunction device by Apple, Inc., of Santa Clara, Calif., include additional functionality such as built-in digital photo and video camera, digital music and movie file playback, self-location capability, and global positioning system (GPS).

Moreover, most mobile phones are configurable to allow a user to customize features such as the display background image, ring-tones, notification sounds, volume levels, and display brightness levels. They can also typically be customized to select which additional functionalities to include, and to customize the features of those functionalities. Moreover, mobile phones may be configurable to allow a user to program the phone with telephone contacts, and text (or short message service (SMS)) message contacts. Mobile phones may also be configurable to allow a user to send, receive, take and/or store various media in the phone, including text (or SMS) messages, photos, audio files (e.g., songs and voice recordings) and videos. Thus, a user may desire and find more useful, a mobile phone configured to have the features, customization, functionality, contacts, and media the user most frequently uses.

When a mobile phone user travels or relocates, the user may want to change phone services (e.g., phone service providers), such as to reduce calling costs, messaging costs, and/or other phone function costs, while maintaining the same mobile phone. For instance, when a user of a mobile phone travels, such as to a region or country where the user desires to use a different phone service, that user may replace the current subscriber identity module (SIM) card of the user's mobile phone with a new or different SIM card that provides service with the desired service provider. Replacing the SIM card allows the user to retain the functionality, and customization of the user's current mobile phone, while using a different telephone service provider. Thus, by using or maintaining his phone when traveling or relocating to different regions or countries, a phone user may make more efficient use of the functionality of his phone, as compared to another phone, due to the users familiarity with that device, while reducing costs for calling, messaging, and using the phone functionalities.

SUMMARY

In accordance with embodiments of the invention, a source mobile telephone is able to detect that a telephone number of the telephone has changed to a new number, and in response, is able send a notice message to contacts identified in a contact list of the mobile telephone to indicate to the contact recipients that the sending mobile telephone has a new telephone number.

For instance, replacing the SIM card of the user's phone may require the mobile phone to have a different, new phone number and/or service provider. The user's mobile phone contacts may not know that the user's phone has a new phone number or service provider. An embodiment of the invention alleviates such a situation by automatically modifying those contacts, of the user's new number.

The user may be prompted by his telephone to select amongst the contacts to be sent the messages. It may receive, from the user, selections identifying the contact, such as from the contact list. Also, the source mobile telephone may prompt its user to indicate a period of time over which the new telephone number is to be in service, or a date and time until which the new telephone number is to remain in service.

In some embodiments, upon detecting that the telephone number has changed, the mobile telephone may automatically send the notice messages to the contacts, without requiring explicit approval from the user for each of the contacts.

In response to receiving the notice message, a contact telephony device may update its contact list to reflect the new number. The contact telephony device may monitor such received notice messages and distinguish them from other messages and notices.

The user of the contact telephony device may be prompted to accept the change of source mobile telephone phone number.

In the case where the received notice message includes a selected period of time or a selected date and time, the contact telephony device may display to its user that the sending mobile telephone will have the new telephone number over the selected period of time or until the selected date and time.

In some cases, the contact telephony device may revert back to the original senders mobile telephone number after the selected period of time or after the selected date and time. The user of the contact telephony device may be prompted to accept the reversion back to the original senders mobile telephone number after the selected period of time, or after the selected date and time.

In some embodiments, upon or in response to receiving the notice message, contact telephony device may automatically to accept the change of source mobile telephone phone number, and/or revert back to the original senders mobile telephone number after the selected period of time, or after the selected date and time, without prompting the contact user to accept the change, or reversion back to the original senders mobile telephone number.

Embodiments also include program instructions stored on a storage medium and/or electronic circuitry to perform the functions and processes described above.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
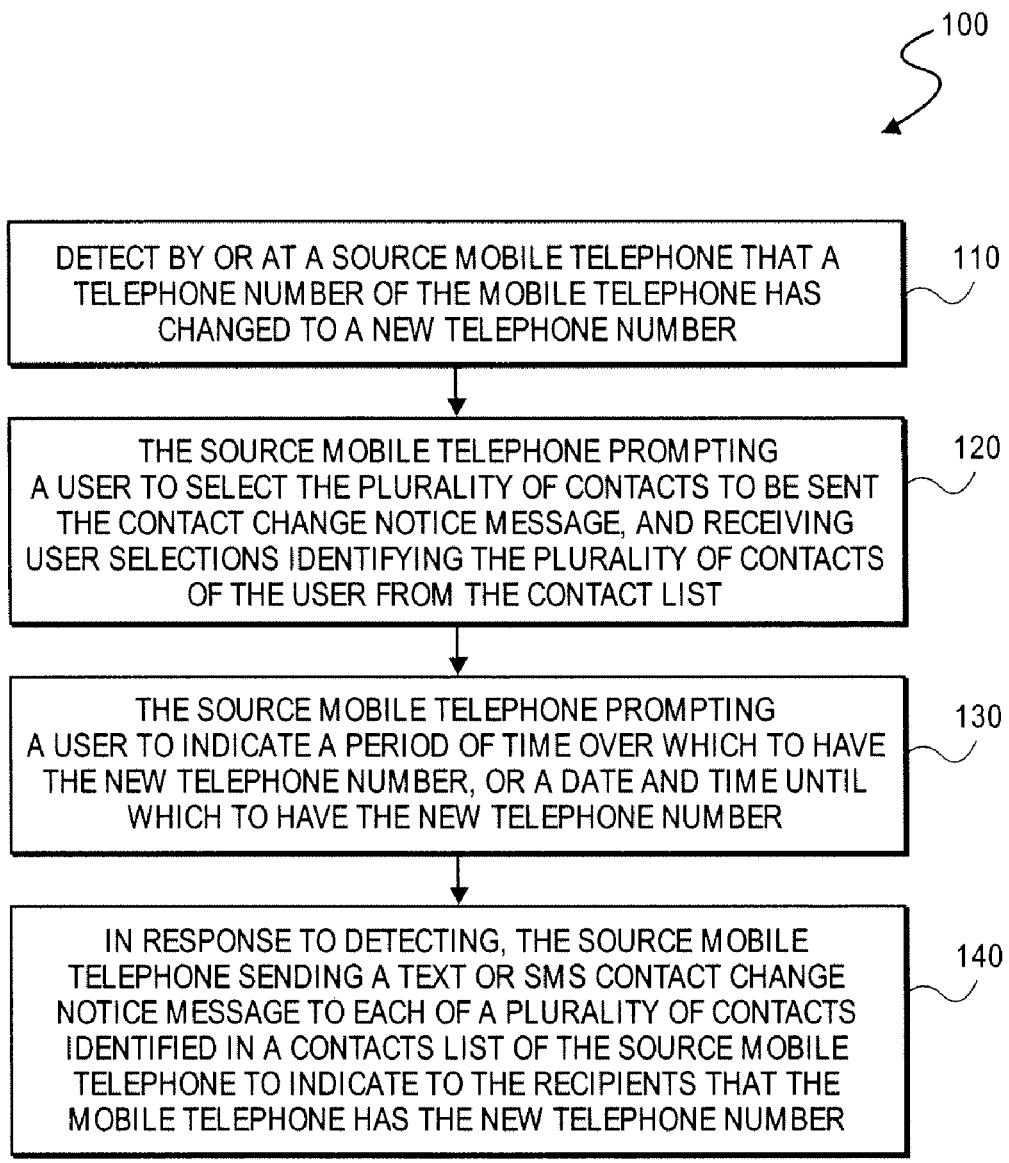
FIG. 1 is flow diagram describing a process for detecting that a telephone number of a sender mobile telephone has changed, and a response to detecting, sending a contact change notice message to contacts of the source mobile telephone.

Embodiments of the invention provide mobile phone users who change their phone's contact information (e.g., service provider and/or phone number) a more efficient process for notifying their phone's contacts of the new number. For example, according to embodiments, a source mobile telephone is able to detect that a telephone number of the telephone has changed to a new number, and in response, is able send a notice message to contacts identified in a contact list of the mobile telephone to indicate to the contact recipients that the sending mobile telephone has a new telephone number.

Embodiments also provide the contact with a more efficient process for updating their contact list with the new number. For example, according to embodiments, in response to receiving the notice message, a contact telephony device is able to update a contact list to reflect the new number.

For instance, a mobile phone user may want to change a phone number or service of their mobile phone to correspond with or as a result of changing to a new job, a new residence, a new location, a new state, a new country or travel (e.g. travel to a new location, such as when a user buys a "China SIM" to insert into their cell phone for service in China). The phone user may change or replace a mobile phone's subscriber identity module (SIM) card (having the user's identification (ID), service provider information, and mobile phone number) with a different SIM card (having the same user's identification, but a different service provider information, and/or a different mobile phone number). If changing the SIM card changes the phone's service and/or phone number, the user's contacts may not know of the change. Thus, it may be necessary for the user to notify the contacts of the user that the user is at a different telephone number, and/or is using a different phone service.

The notice messages or "messages" described herein may be any type of text message or other data carried on channels or services such as short message service (SMS). In some embodiments, the text messages may include SMS text messages that are designed as part of GSM, or another network, such as a 3G network. The text messages may also include text messages as part of non-GSM networks, E-mail messages from phones, standard mail protocol networks (such as SMTP over TCP/IP). It is also considered that the text messages may include contact cards, vCards and the like, such as files or objects that can be passed instead of just "text messages".

The processes, instructions and/or circuitry described herein may solve the problem of notifying the contacts in the user's phone of the contact information change, without the time consuming process of calling, or manually sending separate messages to each contact, and requiring each contact to go through the hassle of changing the number on their phone once notified. Moreover, the processes, instructions, or circuitry described herein will help the sender and receiver better manage the number change, by providing a more accurate "automated" change leading to fewer number transcription errors during the change; and allowing the change to revert back to the original number, at the appropriate time, if the change is not permanent (e.g., such as in the case of the China SIM travel example).

FIG. 1 is flow diagram describing a process for detecting that a telephone number of a source or sender mobile telephone has changed and a response to detecting, sending a contact change notice message to contacts of the source mobile telephone (e.g., to contacts listed in the source mobile phone as having telephony devices). FIG. 1 shows process 100 that may be implemented by program instructions stored on a storage medium and/or electronic circuitry of a mobile telephone (e.g., a "source" or "sender" mobile phone), as described herein.

At block 110 a source mobile telephone detects that a telephone number of the telephone has changed to a new number. For example, block 110 may include a processor, SIM card interface, or circuitry of the phone detecting the change, such as by comparing a phone number of a changed, new or replacement SIM card with that in a memory from the prior SIM card, and detecting a difference or change in the number (e.g., a change in any one of the numbers of the total phone number, such as including area code, prefix and suffix). If the numbers are different, the processor, SIM card interface, or circuitry may send a change notice, including the new number, as noted at block 140.

It can be appreciated that a phone number, as described herein may include all of the numbers of the total phone number required to call a mobile phone (e.g., the source phone) or landline phone, such as including area code, prefix and suffix (e.g., for a United States of America (USA) number); or country code and all other required numbers to call the source (e.g., for a Non-USA number).

In some embodiments, at block 120, the user may be prompted by the telephone to select the contacts, such as from amongst a contact list of the phone, to be sent the messages. At block 120, the telephone may also receive from the user selections identifying the contacts, such as from the contact list.

For example, a dialog may be displayed to the user, asking if the user wants to send an SMS update to "all or some" of the user's contacts stored in the phone? If the user selects "all", then an SMS is sent to each contact. If the user selects "some", then the user may be prompted to select which contacts of the list to send a message to. It can be appreciated that all or some of the contacts send the messages may not be in the phones contact list, but may be entered by the user, in response to prompting for "new" contacts to send a message to. This prompting may provide benefits of notice to the user of the change of phone number notice messages, and selection of which contacts to notify of the change and/or user's travel.

In some embodiments, at block 130, the source mobile may prompt the user to indicate a period of time over which to have the new telephone number or a date and time until which to have the new telephone number. For example, a dialog may be displayed to the user, prompting the user to select either "for how long" or "until when" the new number will be used, or neither? If the user selects "for how long" then a dialog may be displayed prompting the user to indicate a period of time over which the new telephone number is to be in service. If the user selects "for how long" then a dialog may be displayed prompting the user to select (e.g., from a calendar listing) or indicate a date time until which the new telephone number is to remain in service. This prompting may provide benefits of notice to the user of sending the contacts the change of phone number notice messages with the period of time, or date and time for the end of the change, and/or end of the user's travel.

At blocks 120 and 130, a display (such as a touch screen) may be used to prompt the source user to select the contacts to be sent the messages, a period of time over which to have the new telephone number, and/or a date time until which to have the new telephone number. Also, an input, such as a touch screen or keypad may be used to receive inputs from the user to select the contacts, period of time, and/or date and time.

In some embodiments, block 120 and/or block 130 may not occur or may not be performed. For example, in some embodiments, upon detecting that the telephone number has changed, the mobile telephone may "automatically" send the notice messages to the contacts without prompting the user to select the contacts, to indicate a period of time, or to select (or indicate) a time and date as noted above. In this case, referring back to block 110, if the numbers are different, the processor, SIM card interface, or circuitry may automatically send a change notice as noted at block 140 without prompting the user and without requiring explicit approval from the user for each of the contacts.

At block 140, in response, to detecting, the source phone sends a change notice message (e.g., a "notice message") to contacts identified in a contact list of the mobile telephone to indicate to the contact recipients that the sending mobile telephone has a new telephone number. One message may be sent to each of the contacts to indicate the new number or phone number change. Each notice message sent to each of the contacts may be a message addressed only to that one contact (e.g., to a single phone number or URL). Alternatively, each notice may be a message addressed to all of the contacts that notification messages are sent to. The message may be sent based on possible prompting, selecting, or automatically as noted above. In some cases it is only necessary to send one message to make the change and a reversion (see below). However, in other cases, more than one message may be sent to make the change and a reversion.

For example, block 140 may include a processor, transmitter, or circuitry of the phone sending a separate notice message to each contacts identified in a contact list, or selected by the user to indicate to the contact recipients that the sending mobile telephone has a new telephone number. For example, the message may notify to each contact that the sending mobile telephone has a new telephone number (such as by including the sending phone user ID) and identify what that new phone number is.

The notice message may include message data or headers having a predetermined code that identifies the message as a contact change notice message, and the new phone number (e.g., see block 110). Specifically, the notice message with new contact information (e.g. including the new phone number, and also the source user or source mobile phone identification) may be sent in a message that is specifically formatted, such as by including a header (e.g., see header 331 of FIG. 3) indicating that the message is a "Contact Information Change" message (e.g. the header may specify "Contact Information Change"). Each message may include the period of time, or to select a time and date selected above at block 130. It can be appreciated that a benefit of the source phone having detecting and sending capability is being able to send multiple messages to update the source phone number at multiple contacts without having to take the time or effort to make a separate or individual call or notify each contact.

Figure 2:
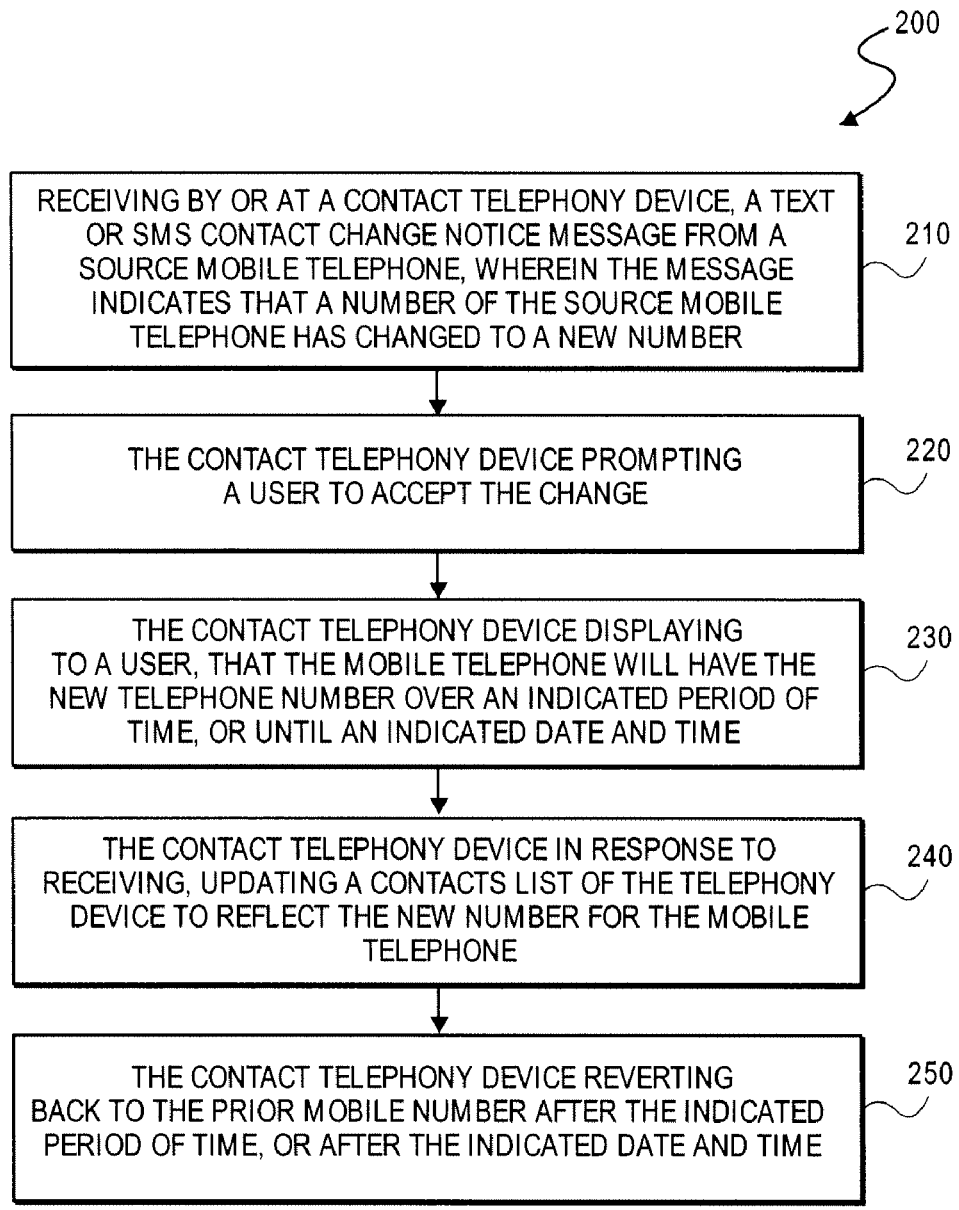
FIG. 2 is a flow diagram describing a process of a contact telephony device receiving a message from a source mobile phone, and in response, updating a contact list of the contact telephony device to reflect the new number for the sender mobile telephone.

FIG. 2 is a flow diagram describing a process of a contact or receiver telephony device (e.g., a mobile or landline telephone) receiving a notice message from a source mobile phone, and in response, updating a contact list of the contact telephony device to reflect the new number for the sender mobile telephone (e.g., the receiver telephony device may have the source phone listed in its contact list as having a mobile phone).

FIG. 2 shows process 200 that may be implemented by program instructions stored on a storage medium and/or electronic circuitry of a telephony device (e.g., a "contact" or "receiver" mobile phone capable device, or landline phone capable device), as described herein. FIG. 2 shows process 200 that may be implemented by program instructions stored on a storage medium and/or electronic circuitry of a mobile telephone (e.g., a "contact" or "receiver" telephony device), as described herein. FIG. 2 may be a process that occurs as a result of a telephony device receiving the notice message sent in block 140 of FIG. 1.

At block 210, in response to receiving the notice message at a contact telephony device indicating that a number of the source mobile telephone has changed to a new number. For example, a contact device may receive a message notifying the device that the sending mobile telephone has a new telephone number (such as by including the sending phone user ID) and identifying what that new phone number is.

For example, block 210 may include a processor, receiver, or circuitry of the device monitoring received messages including the contact change notice message and other notices; and distinguishing or detecting the change notice message from other messages and notices. In accordance with embodiments, the processor, receiver, or circuitry may detect the change by comparing the received message data or headers to a predetermined code that identifies a message as a contact change notice message. For example, a specially formatted notice message having new contact information (e.g. a new source phone number, and also including a source user or mobile phone identification) may be detected by detecting the message has a header (e.g., see header 331 of FIG. 3) indicating "Contact Information Change" (e.g. such as by the header stating that the message is a "Contact Information Change" message). If a notice message is detected the processor, receiver, or circuitry may update a contacts list of the contact device to include or reflect the new number provided in the notice message as noted at block 240. In some cases, "other" messages and notices may include TV voting, product promotion, advertisement, quiz, spam, political campaign, social, work, non-phone related, and other non-phone number change messages and notices.

In some embodiments, at block 220, the user of the contact telephony device may be prompted by the telephony device to accept the change of source mobile telephone phone number. At block 220, the telephony device may also receive from the contact user, selections identifying accepting the change, such as to update or include the new number in a contact list of the telephony device. For example, a dialog may be displayed to the contact user, asking if the user wants to accept the new number to update a contact of the user's contact list stored in the device? If the user selects "yes", then the contact is updated. In some embodiments, if the source user or source phone is not listed in the devices contact list, the contact user may be prompted to add a "new" contact to the list having the new number and source user as the contact. This prompting may provide benefits of notice to the contact user of the change of phone number, and possibly of the source user's travel.

In some embodiments, in the case where the notice message includes an indicated period of time or a selected (or indicated) date and time (e.g., see block 130), at block 230 the contact telephony device may display to its user (e.g., using a dialog displayed to the user) that the sending mobile telephone will have the new telephone number over the indicated period of time, or until the selected (or indicated) date and time. This displaying may provide benefits of notice to the contact user of the period of time, or date and time for the end of the change, and/or end of the source user's travel.

Also, in some embodiments, at block 230, the contact device may prompt the contact user to accept "selected automatic" or "prompted" reversion to the original phone number, after the selected period of time or at the selected date and time. For example, a dialog may be displayed to the user, prompting the user to select either "selected automatic" or "prompted" reversion, or "neither"? If "selected automatic" reversion is selected at block 230, then selected automatic reversion may occur as discussed further below at block 250. If "prompted" reversion is selected at block 230, then prompted reversion may occur as discussed further below at block 250. If "neither" is selected at block 230, then reversion may not occur as discussed further below at block 250.

At block 240, the contact telephony device may update a contact list to reflect the new number for the source mobile telephone. Block 240 may describe the contact telephony device being able to or performing an update of a contact list in response to receiving the notice message. Updating may also be based on possible prompting, selecting (e.g., see blocks 220 and/or 230), or fully automatically as noted herein. Reflecting the new number may include updating, changing replacing a prior phone number in a contact list of the contact device, for the source user or mobile phone. The new number may then be included in the contact list (e.g., all of the numbers of the total phone number area code, prefix and suffix).

For example, block 240 may include a processor, receiver, or circuitry of the device updating a contact identified in a contact list, or selected by the user, with the new number provided in the notice message. The new number may be reverted back to the prior number after the period of time, or to select a time and date noted above at block 230.

In some embodiments, block 220 and/or block 230 may not occur or may not be performed. For example, in some embodiments, upon or in response to receiving the notice message, the contact telephony device may "automatically" accept the change of source mobile telephone phone number without prompting the contact user to accept the change. In this case, referring back to block 210, if the notice is detected, the processor, receiver, or circuitry may automatically accept and make the change to the contact list as noted at block 240 without prompting the user at block 220 or block 230.

At block 250, in some embodiments, the contact telephony device may revert back to the original senders mobile telephone number after the indicated period of time, or after the selected (or indicated) date and time received in the notice message from the source phone. In some cases, at block 250, the contact device may prompt the contact user when reverting back to the original senders mobile telephone number after the indicated period of time, or after the selected (or indicated) date and time, without prompting the contact user to accept the change, or reversion back to the original senders mobile telephone number. This prompting may provide benefits of notice or of a reminder to the contact user that the period of time, or date and time of the number change, and/or source user's travel has ended.

For example, if "selected automatic" reversion is selected at block 230, then selected automatic reversion may occur without further displaying or prompting the contact user, at the time of reversion, about the reversion. If "prompted" reversion is selected at block 230, then prompted reversion may occur by displaying to the contact user, at the time of reversion, that the reversion is going to occur. Prompted reversion may include the contact user selecting (e.g., by dialog and selection) not to revert the new number to the original number. If "neither" is selected at block 230, then reversion may not occur, at the time of reversion.

At blocks 220, 230 and 250, a display (such as a touch screen) may be used to display information and to prompt the contact user to make selections noted for those blocks. Also, an input, such as a touch screen or keypad may be used to receive inputs from the contact user to make selections noted for those blocks.

At block 250, in some embodiments, upon or in response to receiving the notice message, the contact telephony device may "fully automatically" revert back to the original senders mobile telephone number after the indicated period, of time or after the selected (or indicated) date and time, without displaying or prompting the contact user about the reversion. In this case, referring back to block 210, if the notice is detected, the processor, receiver, or circuitry may fully automatically revert to the prior number and make the change to the contact list as noted at block 250 without prompting the user at block 230. It can be appreciated that an advantage of the processes described herein is a reduction in half of the amount of message traffic required to update the contact lists of contact devices to the new phone number and revert them back to the prior phone number. For example, if "selected automatic" reversion or "fully automatic" reversion is used, it is not necessary for the source phone to send another message to the contact phone to cause the reversion to occur (e.g., the change message need only be sent once).

Alternatively, if the phone number of the source phone is changed back to the original or prior number, without reversion (or if it is changed to another number), another notice message with the new contact information (e.g. the new phone number) may be sent in a subsequent message to the contact device(s). That is, FIG. 1 may be repeated to send a subsequent message to revert to the prior number, the source phone number, back to the prior number at contact devices of contacts of the source phone.

Additional benefits of the contact phone having receiving and updating capabilities, include a contact user being able to update one (or multiple) contacts of the device's contact list with new phone numbers, for one (or various) periods of time, with reduced user effort and reduced error. For example, the contact user does not need to think about or write down each new phone number, or possibly when they will be used until. Also, the contact user will know each source user is using a different service and new number, and can avoid calling, texting, sending photos, or sending videos to the source user if the new number or different service will increase the costs of the call, texting, sending photos, or sending videos as compared to the prior number or service.

It is considered that more than one message (e.g., ten or more messages) may be received by contact device from various source phones to indicate the new numbers or phone number changes. In these cases, the benefits above will be multiplied by the number of messages received. For instance, a contact user's device will be able to accurately and efficiently detect and update (and may revert) phone number changes for ten or more source notice messages received by the contact device from various source phones that are using new or changed numbers during an overlapping time period. It can be appreciated that a benefit of the contact phone having receiving and updating capability (and possibly changing numbers for a received time period, such as until a received date and time), will reduce user effort, confusion and errors in accurately and timely changing multiple contact phone numbers.

In some embodiments, for telephony devices that do not have updating capability, the contact user may make the contact list change manually, such as by writing down the new number; cut and paste (or block and copy) the number, or using a menu structure of the device. In this case, the source user still realized benefits noted above for FIG. 1, and the contact user realized benefits of knowing the source user is using a different service and new number, and can avoid calling the source user if the new number or different service will increase the costs of the call, as compared to the prior number or service.

The blocks of process 100 and 200 may be performed sequentially in the order shown, with the exception that any one or more of blocks 120, 130, 220, 230, and 250 may be omitted form those processes. In some embodiments, only blocks 110 and 140 of process 100 will be performed. In some embodiments, only blocks 210 and 240 of process 200 will be performed.

Embodiments may include software application instructions stored in a storage medium (e.g. a machine-readable medium) that when executed by a processor cause the processor (e.g. a machine such as a mobile phone, telephony device, and the like) to perform some or all of the operations described herein (e.g., see FIG. 1 and/or FIG. 2) (e.g. cause some or all of the processes described herein to be performed by the machine). A machine-readable medium may include any mechanism for storing information in a form readable by a machine (e.g., a computer), such as a Compact Disc Read-Only Memory (CD-ROM), Read-Only Memory (ROM), Random Access Memory (RAM), USB memory device, and/or Erasable Programmable Read-Only Memory (EPROM).

In other embodiments, some of these operations might be performed by specific hardware components that contain hardwired logic. Such embodiments include various electronic circuitry, such as electronic hardware, logic, processors, transistors, resistors, inductors, capacitors, registers, processors, memory, signal traces, other hardware described herein (e.g., see FIG. 3) and the like to perform the functions and processes described herein. Those operations might alternatively be performed by any combination of software application instructions components and hardware components.

Figure 3:
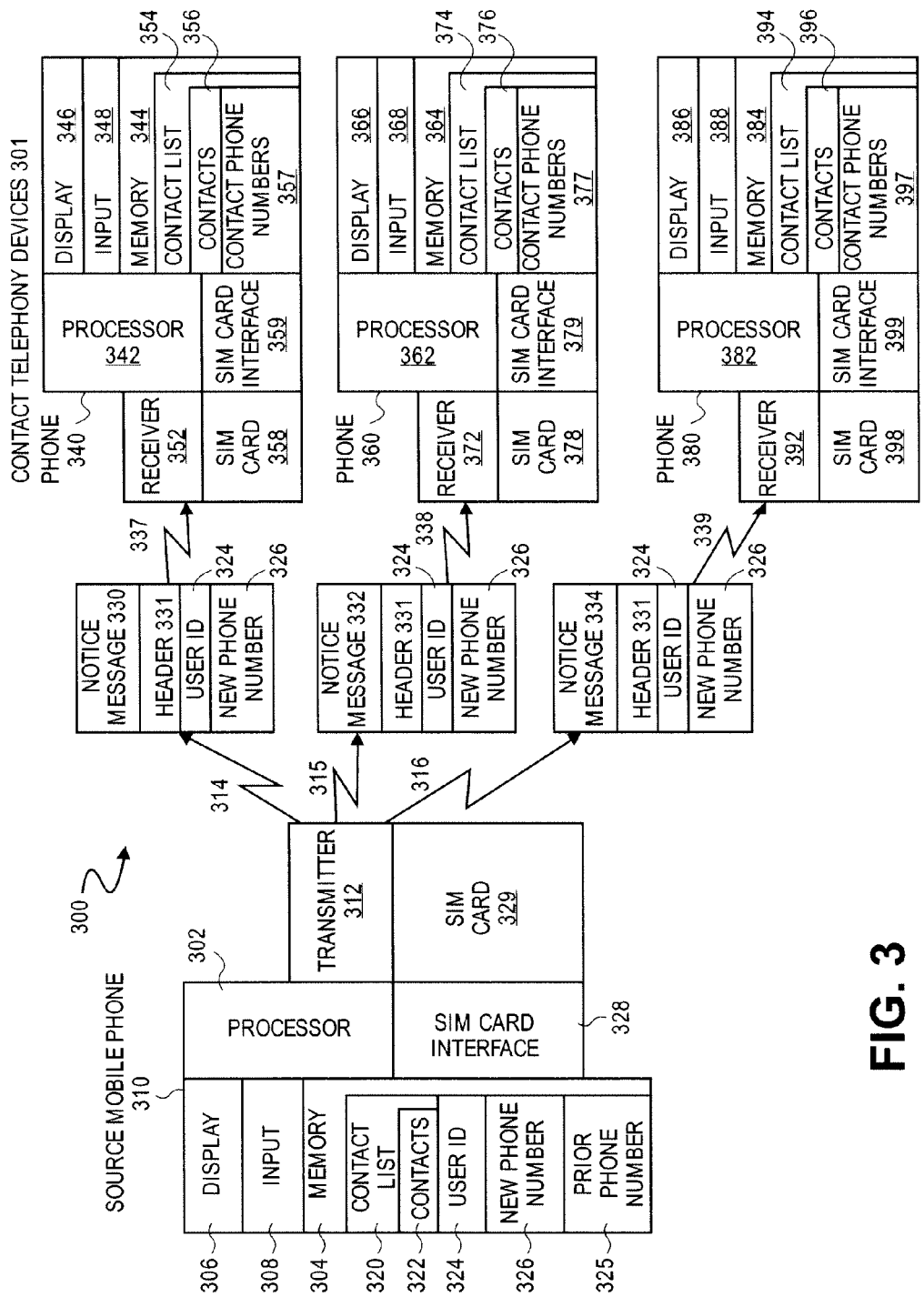
FIG. 3 is a block diagram of a source mobile phone, contact telephony devices, and messages sent by the source mobile phone to the contact telephony devices.

FIG. 3 is a block diagram of network 300 including a source mobile phone 310, contact telephony devices 340, 360, and 380, and messages 330, 332, and 334 sent by the source mobile phone to the contact telephony devices. Network 300 may be a wireless telephony network, or may be a network that includes a wireless telephony network, as well as other network types as further noted below. Mobile phone 310 and contact telephony devices 340, 360, and 380, may be configurable to allow a user to input or program them with telephone contacts (e.g., including user contact identification (ID); and mobile and/or landline phone numbers), and/or message contacts (e.g., including user contact identification (ID); and phone numbers and/or email addresses). A user may perform such inputting or programming by using a display and input of the phone or device.

Embodiments of the invention include a source or sender mobile telephone 310 having memory 304 to store contact list 320, user identification 324 (e.g. identifying the source user and/or phone 310), and new phone number 326. Memory 304 may also include the original, old, or prior phone number 325 for phone 310, such as for comparison with new phone number 326 as noted above. Contact list 320 includes contacts 322 such as user identifications and phone numbers of the contacts of contact list 320 which may include user identification and/or phone numbers for phone 340, 360, and 380. Memory 304 may be a mobile phone memory or computer memory (e.g., a main memory) as know in the industry, such as Read-Only Memory (ROM), Random Access Memory (RAM), and/or Erasable Programmable Read-Only Memory (EPROM).

Display 306 known in the industry, such as by being a part of a graphical user interface (GUI). A display 306 (such as a touch screen) may also be used to prompt the source user to select the contacts to be sent the messages, a period of time over which to have the new telephone number, and/or a date time until which to have the new telephone number, such as noted above for FIGS. 1 and 2.

Input 308 may be an input as known in the industry. Input 308 may be part of a GUI, such as by working with display 306 to provide GUI functionality. Input 308 may be an input, such as a touch screen or keypad may be used to receive inputs from the user to select the contacts, period of time, and/or date and time.

Phone 310 also includes SIM card interface 328, such as including circuitry and a plug-in connector for receiving and removably attaching a SIM card. SIM card 329 is show physically and electronically attached to interface 328. SIM card 329 may include new phone number 326 and user ID 324.

In some embodiments, new phone number 326, stored in memory 304, is a different phone number than the original or prior phone number 325 of phone 310 stored in memory 304. New phone number 326 and may be the phone number stored in SIM card 329. New phone number 326 and user ID 324 may be received from card 329 by phone 310, memory 304, and/or processor 302, such as for comparison with the prior phone number and for inclusion in notice messages.

Phone 310 also includes processor 302 coupled to memory 304, interface 328, input 308, display 306, and transmitter 312. Processor 302 may be a computer processor or microprocessor as known in the mobile phone and/or computer industry. Processor 302 may be a processor to, upon detecting the telephone number change, such as by comparing phone number 326 to an original phone number stored in memory 304, send a notice message, such as sending one or more of notice messages 330, 332 and 334, using transmitter 312. A message (e.g., such as message 330) may be sent to all or some of contacts 322, by sending a message to phone numbers or text message addresses identified in contacts 322.

New phone number 326 and user ID 324 received from SIM card 329 by phone 310 may be compared (e.g., by processor 302) with prior phone number 325 of phone 310 stored in memory 304 (and an original or prior user IDs phone 310, which may be the same as user ID 324) to detect or identify if number 326 is a new phone number 326 received from card 329. If it is different, then the source telephony device (e.g., caused by processor 302) may send a message to contacts, such as sending one or more of notice messages 330, 332 and 334, using transmitter 312 (e.g., see block 140 of FIG. 1). If the numbers are the same, or if the original or prior user IDs phone 310 is different than user ID 324, phone 310 may not send a notification message.

Embodiments of the invention also include a contact or receiver telephony device 340 having receiver 352 to receive the notice message 330 from transmitter 312. Memory 344 is coupled to receiver 352 to store contact list 352 of the contact telephony device 340. Contact list 354 includes contacts 356, and may be a list including a different contact user identification (e.g. including user identification (ID) 324) and a different contact phone number 357 (e.g. including prior or original phone number for phone 310) for each contact of contacts 356. Memory 344 may be a mobile phone or computer memory (e.g., a main memory) as know in the industry, such as Read-Only Memory (ROM), Random Access Memory (RAM), and/or Erasable Programmable Read-Only Memory (EPROM).

Phone 340 includes display 346, which may be a display as known in the industry. Display 346 may be part of a GUI display 346 (such as a touch screen) may be made to prompt the contact user to accept the change of source mobile telephone phone number 326_such as noted above for FIGS. 1 and 2.

Input 348 may be an input as known in the industry. Input 348 may be part of a GUI, such as by working with display 346 to provide GUI functionality. Input 348 may be an input, such as a touch screen or keypad may be used to receive inputs from the contact user to accept the change of source mobile telephone phone number, as noted above for FIGS. 1 and 2.

Phone 340 also includes SIM card interface 359, which may be an interface such as described above for interface 328. Phone 340 is also shown including SIM card 358, which may be a card similar to that described above for card 329, except for having the user identification and phone number for phone 340.

Phone 340 also includes processor 342, such as a computer processor or microprocessor as known in the industry for a mobile phone, telephony device or computer. Processor 342 may be a processor to, in response to receiving notice message 330, update contact list 354 of the contact telephony device to reflect the new number 326, such as noted above for FIGS. 1 and 2.

In some embodiments, new phone number 326, received in message 330 by phone 340 is a different phone number than the prior or original phone number of phone 310, which may be stored in memory 334 (e.g., stored in contact list 354 at the contact of contacts 356 having user ID 324). New phone number 326 and user ID 324 may be received in message 330 by phone 340 and compared with user IDs of contacts 356 to determine or identify the contact of contacts 356 having user ID 324. Once the contact having ID 324 is identified, new phone number 326 received in message 330 may be compared with the prior or original phone number of phone 310, to determine or identify whether new phone number 326 is different than the prior or original phone number of phone 310. If it is different, then the contact telephony device may update the contact list having user ID 324 to reflect the new number for the source mobile telephone (e.g., see block 240 of FIG. 2). If the numbers are the same, phone 340 may not update the contact list having user ID 324.

Alternatively, in some embodiments, once the contact having ID 324 is identified, the contact telephony device will update the contact list having user ID 324 to reflect the new number for the source mobile telephone, regardless of whether the phone numbers are different. In this case, the contact telephony device may save battery life and computing power by performing the update without comparing the phone numbers.

In some embodiments, even if a contact having ID 324 is not identified, new phone number 326 received in message 330 may be used to update the contact list, such as by creating a contact having user ID 324 and the new number for the source mobile telephone (e.g., see block 240 of FIG. 2).

Finally, the contact telephony device 340 may include signal processing circuitry to monitor received messages to distinguish the notice message from other notices and messages, such as by monitoring message headers to detect or identify a header indicating that the message is a "Contact Information Change" message (e.g. the header may specify "Contact Information Change"). This signal processing circuitry may be part of processor 342 or separate circuitry couple to processor 342.

Phones 360 and 380 may have components that correspond to those described above for phone 340. However, each of SIM card 358, 378, and 398 will have a unique user identification and telephone number. As noted above for FIGS. 1 and 2, contact list 354, 374, and/or 394 may include the user identification and original or prior phone number for phone 310. However, in some cases, one or all of those lists may not have user ID 324 and the prior phone number of phone 310 (e.g such as in the case where the user of the contact telephony device has not yet entered phone 310 into the devices contact list).

Arrows 314, 315 and 316 are show to represent transmitter 312 sending messages 330, 332, and 334, respectively, such as using network 300 (e.g., including a wireless telephony network). Likewise, arrows 337, 338, and 339 are show to represent receivers 352, 372, and 392 receiving messages 330, 332, and 334 respectively, such as using network 300 (e.g., including a wireless telephony network). Messages 330, 332, and 334 may include header 331, such as a header indicating that the message is a "Contact Information Change" message (e.g. the header may specify "Contact Information Change"). Messages 330, 332, and 334 may also include user identification (ID) 324, which may identifies the user as the same user and/or identifies the phone as phone 310. In addition, messages 330, 332, and 334 include new phone number 326, which may be a different phone number than the prior or original phone number 325 of phone 310 and may be the phone number stored in SIM card 329 (and received from card 329 by phone 310, memory 304, and/or processor 302). In some embodiments, each message may include the period of time; or a time and date, as noted above at block 130.

It is contemplated, that messages 330, 332, and 334 may be sent over a wireless telephony network that may be combined with other communications networks, capable of sending text and/or SMS messages. Specifically, it is considered that phone 310, 340, 360, and 380 may be any of various mobile phones known in the art capable of sending and receiving text or SMS messages.

The wireless telephony network (e.g. included in network 300) may be in accordance with known cellular telephone communication network protocols including, for example, global system for mobile communications, GSM, enhanced data rate for GSM evolution, EDGE, and worldwide interoperability for microwave access, WiMAX. In some embodiments, the network may include a 3G network, a non-GSM network, standard mail protocols such as SMTP over TCP/IP," and/or networks that support contact cards, vCards, files or objects. Thus, mobile phone 310 and devices 340, 360, and 380 may have a subscriber identity module, SIM, card, which is a detachable smart card that contains the subscription information of its user (e.g. user ID 324 for phone 340), and may also contain a contacts list of the user (e.g. list 320 for phone 310).

Mobile phone 310 and devices 340, 360, and 380 may be made of a housing within which are integrated several components including those described above, as well as a receiver (earpiece speaker), a microphone (mouthpiece), a speakerphone, and a vibration actuator. Additional circuitry, including a combination of hardware circuitry and software, are, of course, included to obtain the needed functionality described herein. These are not described in detail as they would be readily apparent to those of ordinary skill in the art of mobile phone circuits and software. It is sufficient to appreciate that the mobile phone telephony or devices include a processor and circuitry (e.g. a telephone module) which is responsible for coordinating various tasks during a call. The telephone module may be one or more pieces of software or firmware, to coordinate tasks such as dialing a call, directing audio signals during the call (between the microphone and the called party and between the called party and the receiver or speakerphone), and ending the call.

A user or caller of source phone or contact device may own the mobile phone or device, or may otherwise be its primary user. The phone or device may be assigned a unique address by a wireless telephony network operator (e.g., service provider), such as an eleven-digit international telephone number or an Internet Protocol, IP, address.

Any of contact devices 340, 360 and/or 380, may be a mobile phone, or instead may be a land-based device that is coupled to a telephony network through wires or cables. Each of contact devices 340, 360 and/or 380 may also be identified with a unique address, such as a telephone number within the public switched telephone network. The contact devices 340, 360 and/or 380 may also have an Internet protocol (IP) address if it performs calls through a voice over IP (VOIP) protocol. The contact devices 340, 360 and/or 380 may thus be a cellular handset, a plain old telephone service, POTS, analog telephone, a VOIP telephone station, or a desktop or notebook computer running telephony software.

As noted above, embodiments may include machine accessible medium stored on a storage medium such as a CD, DVD, USB memory device or other medium that store program instructions, that when executed, cause a machine or processor (e.g., of a mobile phone and/or telephony device) to perform the functions and processes described herein. This storage medium may be included in, accessible by, read by, or used to program memory 304 and/or another memory accessible by processor 302 to execute instructions to perform processes described above for FIG. 1. Similarly, such a storage medium may be accessible by memory 344, 364, and 384 and/or another memory accessible by processor 302 to execute instructions to perform processes described above for FIG. 2.

The processes, instructions, and circuitry herein may be designed and/or sold by handset manufacturers, such as manufacturers of a "source device" that sends a notice when its phone number has been changed; and/or a "contact" device or a recipient device that receives the notice of the phone number change.

The invention is not limited to the specific embodiments described above. For example, although source contact information has been described in the context of updating a source phone number, the concept is applicable to updating other contact information of a contact listing, such as a personal or job email address, phone service provider, or a residence or job street address, such as in response to a change of residence, phone service provider, email address, or job. In this situation, the notice message (e.g. message 330, 332, and 334) may include a new email address and/or a new street address, in place of the phone number (e.g. in place of phone number 320, but the message will also still include user ID 324 and header 331). Accordingly, other embodiments are within the scope of the claims.

What is claimed is:

1. A machine-implemented method in a mobile telephone, comprising: the mobile telephone detecting that a telephone number of the mobile telephone has changed from a first telephone number to a new telephone number; and in response to said detecting, the mobile telephone sending a contact change notice message to each of a plurality of contacts identified in a contacts list of the mobile telephone, wherein the message indicates to its recipient that the mobile telephone has the new telephone number over a finite indicated period of time or until an indicated date and time, and wherein the first telephone number is to be automatically reverted back to, after the finite indicated period of time or after the indicated date and time sent in the contact change notice message.

2. The method of claim 1, wherein sending comprises:
prompting a user of the mobile telephone that sends the contact change notice message to indicate one of a finite period of time over which to have the new telephone number, and a date and time until which to have the new telephone number prior to sending the contact change notice message.

3. The method of claim 1, wherein sending comprises:
prompting a user to select the plurality of contacts to be sent the contact change notice message; and
receiving user selections identifying the plurality of contacts of the user from the contact list.

4. The method of claim 1, wherein sending comprises the mobile telephone automatically sending a text or SMS contact change notice without prompting the user to identify the contacts.

5. A machine-implemented method in a telephony device, comprising:
the telephony device receiving a contact change notice message from a mobile telephone, wherein the message indicates that a number of the mobile telephone has changed from a first telephone number to a new number; and
in response to said receiving, the telephony device updating a contacts list of the telephony device to reflect the new number for said mobile telephone, wherein the received message indicates to its recipient that the mobile telephone will have the new telephone number over a finite indicated period of time or until an indicated date and time; and
reverting back to the first telephone number after the finite indicated period of time or after the indicated date and time received in the contact change notice message.

6. The method of claim 5, wherein reverting back comprises automatically reverting back to the first telephone number.

7. The method of claim 5, wherein updating comprises the telephony device that received the message displaying to a user of the telephony device, the finite indicated period of time or the indicated date and time received in the contact change notice message.

8. The method of claim 5, wherein updating comprises the telephony device prompting a user of the telephony device to accept the update.

9. The method of claim 5, wherein receiving comprises the telephony device:
monitoring received messages including the contact change notice message and other messages;
distinguishing the contact change notice message from the other messages; and
automatically updating the contacts list without prompting a user of the telephony device to accept the update.

10. A mobile telephone comprising:
a memory to store a contacts list and a mobile telephone number;
a processor coupled to the memory, the processor to, upon detecting that the telephone number of the mobile telephone has changed from a first telephone number to a new telephone number, send a contact change notice message to each of a plurality of contacts identified in the contacts list, wherein the message indicates to its recipient that the mobile telephone has the new telephone number over a finite indicated period of time or until an indicated date and time, and wherein the first telephone number is to be automatically reverted back to, after the finite indicated period of time or after the indicated date and time sent in the contact change notice message.

11. The mobile telephone of claim 10, further comprising an input to prompt a user of the mobile telephone that sends the contact change notice message to indicate a finite period of time over which to have the new telephone number, or a date and time until which to have the new telephone number prior to sending the contact change notice message.

12. The mobile telephone of claim 10, further comprising an input to prompt a user to select the plurality of contacts to be sent the contact change notice message from the contact list, and to receive user selections identifying the contacts from the contact list.

13. The mobile telephone of claim 10, wherein the memory stores a user identity; and further comprising:

an interface coupled to the processor, the interface detachably coupled to a subscriber identity module (SIM) card storing the user identity and the new mobile telephone number.

14. A contact telephony device comprising: a receiver to receive a contact change notice message from a sender mobile telephone, wherein the message indicates that a number of the sender mobile telephone has changed from a first telephone number to a new number;

a memory coupled to the receiver to store a contact list of the contact telephony device which includes a number associated with the sender mobile telephone;

a processor coupled to the memory to, in response to receiving the contact change notice message, automatically update the contacts list to reflect the new number for said sender mobile telephone, wherein the message indicates to its recipient that the mobile telephone will have the new telephone number over a finite indicated period of time or until an indicated date and time, and wherein the processor reverts back to the first telephone number after the finite indicated period of time or after the indicated date and time received in the contact change notice message.

15. The contact telephony device of claim 14, wherein the processor is to automatically revert back to the first telephone number.

16. The contact telephony device of claim 14, further comprising a display to display to a user of the telephony device that received the message, the finite indicated period of time or the indicated date and time received in the contact change notice message.

17. The contact telephony device of claim 14, further comprising an input to prompt a user of the contact telephony device to accept the update.

18. The contact telephony device of claim 14, wherein the processor further comprises signal processing circuitry to monitor received messages including the contact change notice message and other messages, to distinguish the contact change notice message from the other messages, and to automatically update the contacts list without prompting a user of the telephony device to accept the change.

19. The contact telephony device of claim 14, wherein the memory stores a sender identity corresponding to the sender mobile telephone, and wherein the notification message includes the sender identity.

* * * * *